(12) United States Patent
Kim et al.

(10) Patent No.: US 10,387,716 B2
(45) Date of Patent: Aug. 20, 2019

(54) METHOD AND APPARATUS FOR RECOGNIZING FACIAL EXPRESSION

(71) Applicant: Samsung Electronics Co., Ltd., Suwon-si (KR)

(72) Inventors: Youngsung Kim, Suwon-si (KR); Byungin Yoo, Seoul (KR); Youngjun Kwak, Seoul (KR); Chang Kyu Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 11 days.

(21) Appl. No.: 15/467,396

(22) Filed: Mar. 23, 2017

(65) Prior Publication Data

US 2018/0114057 A1  Apr. 26, 2018

(30) Foreign Application Priority Data

Oct. 21, 2016  (KR) .......................... 10-2016-0137382

(51) Int. Cl.
*G06K 9/00* (2006.01)

(52) U.S. Cl.
CPC ..... *G06K 9/00302* (2013.01); *G06K 9/00228* (2013.01); *G06K 9/00268* (2013.01); *G06K 9/00308* (2013.01)

(58) Field of Classification Search
CPC ........... G06K 9/00302; G06K 9/00268; G06K 9/00228
See application file for complete search history.

(56) References Cited

U.S. PATENT DOCUMENTS

| | | | | |
|---|---|---|---|---|
| 8,682,531 B2* | 3/2014 | Miyajima | .......... | G01C 21/3647 701/28 |
| 9,547,763 B1* | 1/2017 | Avital | .................. | G06F 21/36 |
| 9,818,024 B2* | 11/2017 | Bacivarov | .......... | G06K 9/00302 |
| 2007/0122036 A1* | 5/2007 | Kaneda | .............. | G06K 9/00281 382/190 |
| 2009/0087082 A1* | 4/2009 | Abe | .......................... | G03F 1/84 382/147 |
| 2009/0087111 A1* | 4/2009 | Noda | ................ | H04N 21/23892 382/238 |
| 2009/0232365 A1* | 9/2009 | Berthilsson | ........ | G06K 9/00281 382/118 |

(Continued)

FOREIGN PATENT DOCUMENTS

| | | |
|---|---|---|
| JP | 5234833 B2 | 4/2013 |
| JP | 2013-003706 A | 7/2013 |
| KR | 10-2016-0053455 A | 5/2016 |

OTHER PUBLICATIONS

Shin, Young Geun, et al. "Development of an Emotion Recognition Robot using a Vision Method." IE Interfaces vol. 19, No. 3 (2006): 174-180.

(Continued)

*Primary Examiner* — Ming Y Hon
(74) *Attorney, Agent, or Firm* — NSIP Law

(57) ABSTRACT

A method and apparatus for recognizing a facial expression is provided. The method of recognizing the facial expression includes extracting a feature from an input image, extracting a feature from a reference image, and recognizing a user facial expression based on a difference between the feature of the input image and the feature of the reference image.

44 Claims, 12 Drawing Sheets

(56) References Cited

U.S. PATENT DOCUMENTS

| | | | | |
|---|---|---|---|---|
| 2009/0274216 | A1* | 11/2009 | Kato | H04N 19/147 375/240.16 |
| 2010/0124362 | A1* | 5/2010 | Wu | G03G 15/0152 382/112 |
| 2011/0007174 | A1* | 1/2011 | Bacivarov | G06K 9/00281 348/222.1 |
| 2011/0134026 | A1* | 6/2011 | Kang | G06F 3/011 345/156 |
| 2013/0148860 | A1* | 6/2013 | Musatenko | G06K 9/00228 382/107 |
| 2013/0182918 | A1* | 7/2013 | Kovtun | G06K 9/00288 382/118 |
| 2013/0259324 | A1* | 10/2013 | Huang | G06K 9/00281 382/118 |
| 2013/0266193 | A1* | 10/2013 | Tiwari | G06K 9/00771 382/115 |
| 2014/0105504 | A1* | 4/2014 | Krupka | G06K 9/4661 382/195 |
| 2016/0048536 | A1* | 2/2016 | Di | G06F 17/30247 382/165 |
| 2016/0132718 | A1* | 5/2016 | Park | G06K 9/00248 382/118 |
| 2016/0148080 | A1* | 5/2016 | Yoo | G06K 9/4628 382/157 |
| 2017/0116750 | A1* | 4/2017 | Pond | G06T 7/11 |
| 2017/0311921 | A1* | 11/2017 | Feuerlein | A61B 6/032 |
| 2018/0032796 | A1* | 2/2018 | Kuharenko | G06K 9/00288 |

OTHER PUBLICATIONS

Liu, Wei-feng, et al., "Expression Feature Extraction Based on Difference of Local Binary Pattern Histogram Sequences", *Proceedings of the 9th International Conference on Signal Processing*, Oct. 2008, (pp. 2082-2084).

Sharma, Abhishek et al., "Facial Expression Recognition using Virtual Neutral Image Synthesis", *Nat. Conf. Comp. Vi. Patt. Reco. Image Proc. and Graphics*, 2010 (6 pages in English).

Mlakar, Uroš et al. "Automated facial expression recognition based on histograms of oriented gradient feature vector differences", *Signal, Image and Video Processing* 9.1, 2015 (pp. 245-253).

European Search Report dated Mar. 16, 2018 in corresponding European Patent Application No. 17194781.5 (12 pages in English).

Lai, Jian Huang et al., "Face Recognition Using Holistic Fourier Invariant Features", *Pattern Recognition*, vol. 34, No. 1, Jan. 2001, pp. 95-109 (15 pages in English).

Chandrasiri, Naiwala Pathirannehelage et al., "Real Time Facial Expression Recognition System with Applications to Facial Animation in MPEG-4", *IEICE Transactions on Information and Systems*, vol. 84, No. 8, Aug. 2001, pp. 1007-1017 (11 pages in English).

Lee, Seung Ho et al., "Intra-Class Variation Reduction Using Training Expression Images for Sparse Representation Based Facial Expression Recognition", *IEEE transactions on Affective Computing*, vol. 5, No. 3, Jul. 2014, pp. 340-351 (12 pages in English).

Extended European Search Report dated Jul. 20, 2018 in European Patent Application No. 17194781.5 (11 pages in English).

\* cited by examiner

METHOD AND APPARATUS FOR RECOGNIZING FACIAL EXPRESSION

CROSS-REFERENCE TO RELATED APPLICATION(S)

This application claims the benefit under 35 USC § 119(a) of Korean Patent Application No. 10-2016-0137382 filed on Oct. 21, 2016, in the Korean Intellectual Property Office, the entire disclosure of which is incorporated herein by reference for all purposes.

BACKGROUND

1. Field

The following description relates to a method and apparatus for recognizing a facial expression.

2. Description of Related Art

A facial expression is formed by movements of facial muscles that are simulated by neural stimulation. A facial expression is recognized by processing an image of visual evidence extracted from an input image. Facial expression information may be estimated based on a facial expression represented in an input image. The facial expression information may be represented by a set of action units (AUs) of facial muscles. For example, in response to a new test image being input, a facial expression recognition apparatus may search for positions of facial muscle forms, indicate the facial muscle forms of which the positions are retrieved using a feature descriptor, and compare the indicated facial muscle forms to an AU model that has been defined in advance.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of recognizing a facial expression of a user, the method including extracting a feature from an input image, extracting a feature from a reference image, and recognizing the facial expression based on a difference between the feature of the input image and the feature of the reference image.

The method may include generating the reference image based on the input image.

The method may include encoding the input image using an encoder that is trained in advance, and generating the reference image by decoding the encoded input image using a decoder that is trained in advance.

The encoder and the decoder may be trained in advance to decrease a difference between the reference image and a target image corresponding to a facial expression to be represented through the reference image.

The encoder and the decoder may be trained in advance to increase a difference between the input image and the reference image within a threshold.

The input image and the feature of the reference image may be extracted by extractors that are trained in advance.

The extractors may be trained in advance to decrease a difference between the input image and a first image converted based on the feature of the input image, and to decrease a difference between a second image converted based on the feature of the reference image and a target image corresponding to a facial expression to be represented through the reference image.

The extractors may be trained in advance to increase a difference between the first image and the second image within a threshold.

The extractors may be trained in advance to increase the difference between the feature of the input image and the feature of the reference image within a threshold.

The extractors may share a parameter.

The extracting of the feature from the reference image may include extracting a first feature from a first reference image and a second feature from a second reference image, and the recognizing of the user facial expression may include recognizing the user facial expression based on a difference between the feature of the input image and the first feature, and a difference between the feature of the input image and the second feature.

The difference may include an element-wise difference between a feature vector extracted from the input image and a feature vector extracted from the reference image.

In another general aspect, there is provided a facial expression recognizing apparatus including a processor configured to extract a feature from an input image, to extract a feature from a reference image, and to recognize a facial expression of a user based on a difference between the feature of the input image and the feature of the reference image.

The processor may be configured to generate the reference image based on the input image.

The processor may be configured to encode the input image using an encoder that is trained in advance and to generate the reference image by decoding the encoded input image using a decoder that is trained in advance.

The encoder and the decoder may be trained in advance to decrease a difference between the reference image and a target image corresponding to a facial expression to be represented through the reference image.

The encoder and the decoder may be trained in advance to decrease a difference between the input image and the reference image within a threshold.

The feature of the input image and the feature of the reference image may be extracted by extractors that are trained in advance.

The extractors may be trained in advance to decrease a difference between the input image and a first image converted based on the feature of the input image, and to decrease a difference between a second image converted based on the feature of the reference image and a target image corresponding to a facial expression to be represented through the reference image.

The first image and the second image may be converted by converters that are trained in advance, and the converters may be trained in advance to increase a difference between the first image and the second image within a threshold.

The extractors may be trained in advance to increase a difference between the feature of the input image and the feature of the reference image within a threshold.

The extractors may share a parameter.

The reference image may include a first reference image and a second reference image, and the processor may be configured to extract a first feature from the first reference image and a second feature from the second reference image, and to recognize the user facial expression based on a difference between the feature of the input image and the first feature and a difference between the feature of the input image and the second feature.

The sentence generating apparatus may include a memory configured to store instructions to be executed by the processor.

In another general aspect, there is provided a digital device including a sensor configured to capture an input image, a memory configured to store instructions, and a processor configured to execute the instructions to extract a feature from the input image, to extract a feature from a reference image, and to recognize a facial expression of a user based on a difference between the feature of the input image and the feature of the reference image.

The digital device of claim 26, wherein the processor may include an extractor configured to extract the feature from the input image, and to extract the feature from the reference image, a comparer configured to compare the feature of the input image with the feature of the reference image, and a recognizer configured to recognize the facial expression of the input image based on the comparison.

The digital device may include a display, and the processor may be configured to display the facial expression of the user on the display.

The digital device may including an antenna, and a cellular radio configured to transmit and receive data via the antenna according to a cellular communications standard, wherein the processor is further configured to transmit the facial expression of the user using the cellular radio.

Other features and aspects will be apparent from the following detailed description, the drawings, and the claims.

Figure 1:
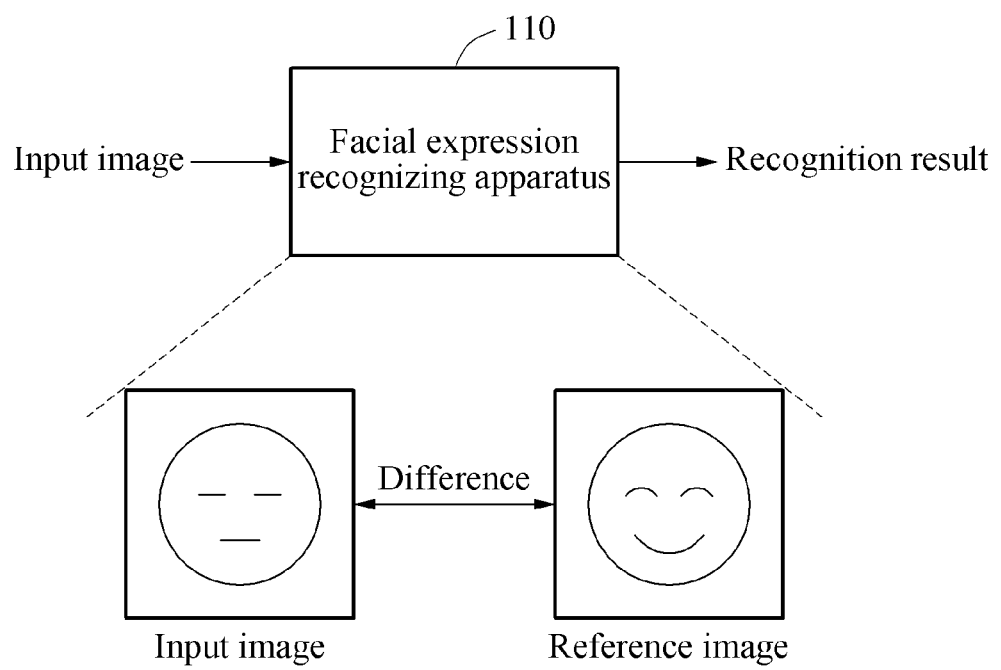
FIG. 1 is a diagram illustrating an example of a process of recognizing a facial expression.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing particular examples only and is not to be limiting of the examples. As used herein, the singular forms "a," "an," and "the" are intended to include the plural forms as well, unless the context clearly indicates otherwise.

When describing examples with reference to the accompanying drawings, like reference numerals refer to like constituent elements and a repeated description related thereto will be omitted. When it is determined detailed description related to a related configuration they may make the purpose of the examples unnecessarily ambiguous in describing the examples, the detailed description will be omitted here.

FIG. 1 is a diagram illustrating an example of a process of recognizing a facial expression. Referring to FIG. 1, a facial expression recognizing apparatus 110 receives an input image and outputs a result of recognizing the facial expression represented in the input image.

The facial expression recognizing apparatus 110 recognizes a user facial expression represented in the input image based on a difference between the input image and a reference image. When the facial expression being recognized based on the input image without using the reference image, there may be difficulty in recognizing a minute change in the facial expression or the facial expression of the input image may be falsely recognized as one of other similar facial expressions. The facial expression recognizing apparatus 110 recognizes the facial expression represented in the input image based on the difference between the input image and the reference image. Thus, the facial expression recognizing apparatus 110 accurately recognize the facial expression from the input image even when there is a relatively small change in the facial expression in the input image or there are other facial expressions similar to the facial expression of the input image.

The facial expression recognizing apparatus 110 learns, in advance, a difference between facial expressions using sample images of various facial expressions. For example, the facial expression recognizing apparatus 110 compares a difference between the input image and the reference image or differences between the pre-learned facial expressions, and recognizes the user facial expression of the input image based on a result of the comparison. As will be described below, the facial expression recognizing apparatus 110 recognizes the user facial expression from the input image using an auto encoder configured to generate the reference image from the input image, an extractor configured to extract a feature from the input image and a feature from the reference image, a comparer configured to compare the feature of the input image to the feature of the reference image, and a recognizer configured to recognize the facial expression included in the input image based on a result of the comparison. The auto encoder includes an encoder configured to extract a feature for generating the reference image from the input image and a decoder configured to convert the feature extracted by the encoder into the reference image. Each of the auto encoder, the extractor, the comparer, and the recognizer may be provided in a neural network and trained in advance using a machine learning scheme, for example, a deep learning scheme.

For example, the auto encoder may be trained in advance to generate the reference image from the input image, and the extractor may be trained in advance to extract the feature from an image. The recognizer may be trained in advance to recognize a facial expression in the image based on a difference between features. Training a neural network includes specifying learning parameters of the neural network. Hereinafter, the encoder and the extractor are referred to by different terms for ease of description, but both of the encoder and the extractor may perform an operation of encoding an image to a feature vector. Also, the decoder and the converter are also referred to by different terms for ease of description, but both of the decoder and the converter may perform an operation of decoding a feature vector to an image.

In an example, the input image and the reference image are input to the facial expression recognizing apparatus 110. The reference image may be obtained by photographing a facial expression when the facial expression is recognized, and the reference image and the input image may be provided for the facial expression recognizing apparatus 110. For example, a user may be requested to make a neutral facial expression and the user with the neutral facial expression is photographed to obtain a reference image representing the neutral facial expression. In an example, the reference image is photographed in advance, stored in a memory, and provided for the facial expression recognizing apparatus 110 in response to the facial expression being recognized. In an example, the reference image represents a predetermined facial expression, and a feature vector extracted from the reference image is stored in the memory.

In an example, the input image is input to the facial expression recognizing apparatus 110, and the reference image is additionally generated by the facial expression recognizing apparatus 110. For example, the facial expression recognizing apparatus 110 generates the reference image from the input image using the auto encoder that is trained in advance. The auto encoder may be trained to generate the reference image representing the predetermined facial expression. As will be described below, the auto encoder may include the encoder configured to encode the input image and the decoder configured to decode the encoded input image. In an example, an output of the decoder is the reference image.

Performance of recognition is improved when features extracted from images are compared than when the images are directly compared based on pixels. Thus, the facial expression recognizing apparatus 110 may compare the feature extracted from the input image to the feature extracted from the reference image without directly comparing the input image to the reference image. For example, the facial expression recognizing apparatus 110 extracts the feature from the input image and the feature from the reference image using the extractor that is trained in advance. The extracted feature may be represented in a vector form, and the extracted feature is referred to as a feature vector.

In an example, the facial expression recognizing apparatus 110 extracts the feature from the input image and the feature from the reference image using a plurality of extractors. For example, the facial expression recognizing apparatus 110 extracts the feature from the input image using a first extractor and extracts the feature from the reference image using a second extractor. In this example, the first extractor and the second extractor may have an identical parameter. The extractors having an identical parameter may be understood to mean that the extractors share the parameter. When the first extractor and the second extractor sharing the parameter, the feature may be extracted from the input image and the feature may be extracted from the reference image under a same condition.

The feature of the input image and the feature of the reference image extracted by the extractor may be input to the comparer. The comparer may compare the feature of the input image to the feature of the reference image, and output the difference between the feature of the input image and the feature of the reference image as a result of the comparison.

For example, the comparer outputs an element-wise difference between a feature vector extracted from the input image and a feature vector extracted from the reference image. A dimension of the feature vector of the input image is identical to a dimension of the feature vector of the reference image. In an example, the feature vector of the input image may be (0.92, 0.13, 0.57, 0.20), and the feature vector of the reference image may be (0.32, 0.73, 0.11, 0.15). In this example, the element-wise difference between the feature vector of the input image and the feature vector of the reference image may be (0.60, −0.60, 0.46, 0.05). For example, a difference between the feature of the input image and the feature of the reference image may be defined based on various methods in addition to a method using the element-wise difference.

As described above, the comparer may be provided in the neural network. In another example, the comparer is provided using a function for outputting a difference between input vectors. The comparer may receive feature vectors from the extractor and output a difference between the feature vectors as a result of the comparison.

The comparison result of the comparer may be input to the recognizer. The recognizer may output a recognition result based on the result of the comparison. The recognition result may indicate a facial expression corresponding to the input image among predetermined facial expressions. The recognizer may receive a vector having a predetermined length, and may be trained in advance to output the recognition result corresponding to the vector. When there is difference between the feature of the input image and the feature of the reference image, the recognizer may be trained in advance to output the recognition result corresponding to the difference.

For example, the facial expression recognizing apparatus 110 recognizes the user facial expression represented in the input image through a plurality of reference images. For example, the facial expression recognizing apparatus 110 obtains a first comparison result based on a difference between the feature of the input image and a feature of a first reference image, and obtains a second comparison result based on a difference between the feature of the input image and a feature of a second reference image. The first comparison result and the second comparison result is input to the recognizer, and the recognizer may output the recognition result.

In an example, the auto encoder, the extractor, the comparer, and the recognizer is trained based on a loss function and a comparison function. In an example, the loss function is used to train a learning target to decrease a difference between an output of the learning target and a label corresponding to a desired reference of the output of the learning target. In an example, the comparison function is used to train the learning target to increase the difference between the output of the learning target and the label corresponding to the desired reference of the output of the learning target. For example, the auto encoder may be trained to output an image similar to a target image provided to the label based on the loss function. Also, the auto encoder may be trained to output an image different from the input image provided to the label based on the comparison function.

The facial expression recognizing apparatus 110 recognizes an emotion of the user based on the result of the recognition. The recognition result may indicate a facial expression corresponding to the input image among the predetermined facial expressions. Thus, the facial expression recognizing apparatus 110 may understand the user expression through the result of the recognition. When the input image is obtained by photographing the user in real time, a current facial expression of the user may be learned based on the input image and an emotional condition of the user may be estimated based on the current facial expression. Thus, the facial expression recognizing apparatus 110 may be included in various apparatuses that utilize user emotion recognition. In an example, the facial expression recognizing apparatus 110 may be included in a home robot, an audience estimating device, or any other device described below. In response to the facial expression recognizing apparatus 110 being included in the home robot or the audience estimating device, the home robot may make a gesture corresponding to the emotion of the user and the audience estimating device may understand a reaction of an audience to a speech.

In other examples, the facial expression recognizing apparatus 110 may be embedded in or interoperate with various digital devices such as, for example, an intelligent agent, a mobile phone, a cellular phone, a smart phone, a wearable smart device (such as, for example, a ring, a watch, a pair of glasses, glasses-type device, a bracelet, an ankle bracket, a belt, a necklace, an earring, a headband, a helmet, a device embedded in the cloths), a personal computer (PC), a laptop, a notebook, a subnotebook, a netbook, or an ultra-mobile PC (UMPC), a tablet personal computer (tablet), a phablet, a mobile internet device (MID), a personal digital assistant (PDA), an enterprise digital assistant (EDA), a digital camera, a digital video camera, a portable game console, an MP3 player, a portable/personal multimedia player (PMP), a handheld e-book, an ultra mobile personal computer (UMPC), a portable lab-top PC, a global positioning system (GPS) navigation, a personal navigation device or portable navigation device (PND), a handheld game console, an e-book, and devices such as a high definition television (HDTV), an optical disc player, a DVD player, a Blue-ray player, a setup box, robot cleaners, a home appliance, content players, communication systems, image processing systems, graphics processing systems, other consumer electronics/information technology (CE/IT) device, or any other device capable of wireless communication or network communication consistent with that disclosed herein or various other Internet of Things (IoT) devices that are controlled through a network. The digital devices may be implemented in a smart appliance, an intelligent vehicle, an apparatus for automatic driving, a smart home environment, a smart building environment, a smart office environment, office automation, and a smart electronic secretary system.

The digital devices may also be implemented as a wearable device, which is worn on a body of a user. In one example, a wearable device may be self-mountable on the body of the user, such as, for example, a ring, a watch, a pair of glasses, glasses-type device, a bracelet, an ankle bracket, a belt, a band, an anklet, a belt necklace, an earring, a headband, a helmet, a device embedded in the cloths, or as an eye glass display (EGD), which includes one-eyed glass or two-eyed glasses.

Figure 2:
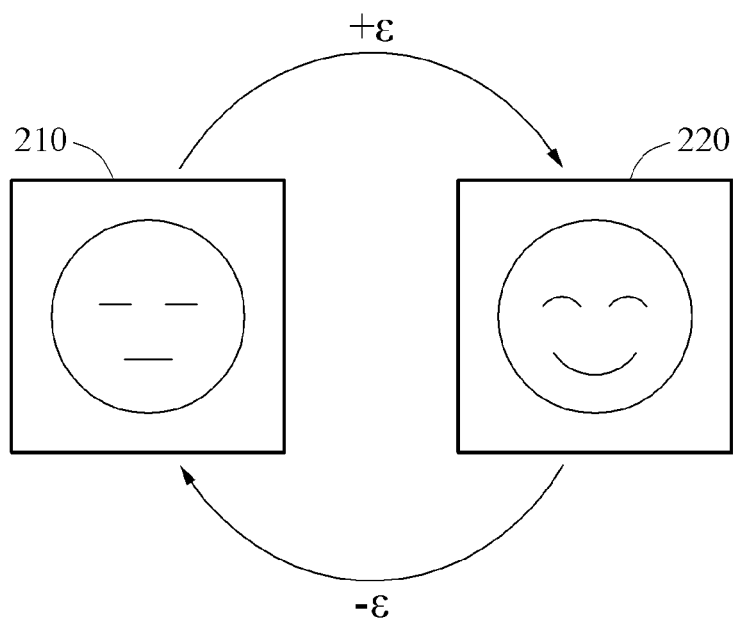
FIG. 2 is a diagram illustrating an example of a difference between facial expressions.

FIG. 2 is a diagram illustrating an example of a difference between facial expressions. FIG. 2 illustrates a neutral facial expression 210 and a happy facial expression 220.

A difference ε may be present between the neutral facial expression 210 and the happy facial expression 220. For example, the happy facial expression 220 is obtained by adding the difference ε to the neutral facial expression 210, and the neutral facial expression 210 is obtained by removing the difference ε from the happy facial expression 220. Thus, a relationship between images is expressed as shown below.

$$I1 = I2 + \varepsilon_t \qquad \text{[Equation 1]}$$

I1 denotes a first facial expression and I2 denotes a second facial expression. $\varepsilon_t$ denotes a value of a difference between the first facial expression I1 and the second facial expression I2. A difference between facial expressions may be determined by various facial expressions. For example, a difference $\varepsilon_2$ may be present between a neutral facial expression and a surprised facial expression, and a difference $\varepsilon_3$ may be present between a happy facial expression and a surprised facial expression. Thus, the first facial expression I1 may be estimated from the second facial expression I2 based on values of differences between various facial expressions. As will be described below, the facial expression recognizing apparatus 110 learns differences between images of various facial expressions in advance and recognizes a facial expression represented in an input image based on a difference between the input image and a reference image.

Figure 3:
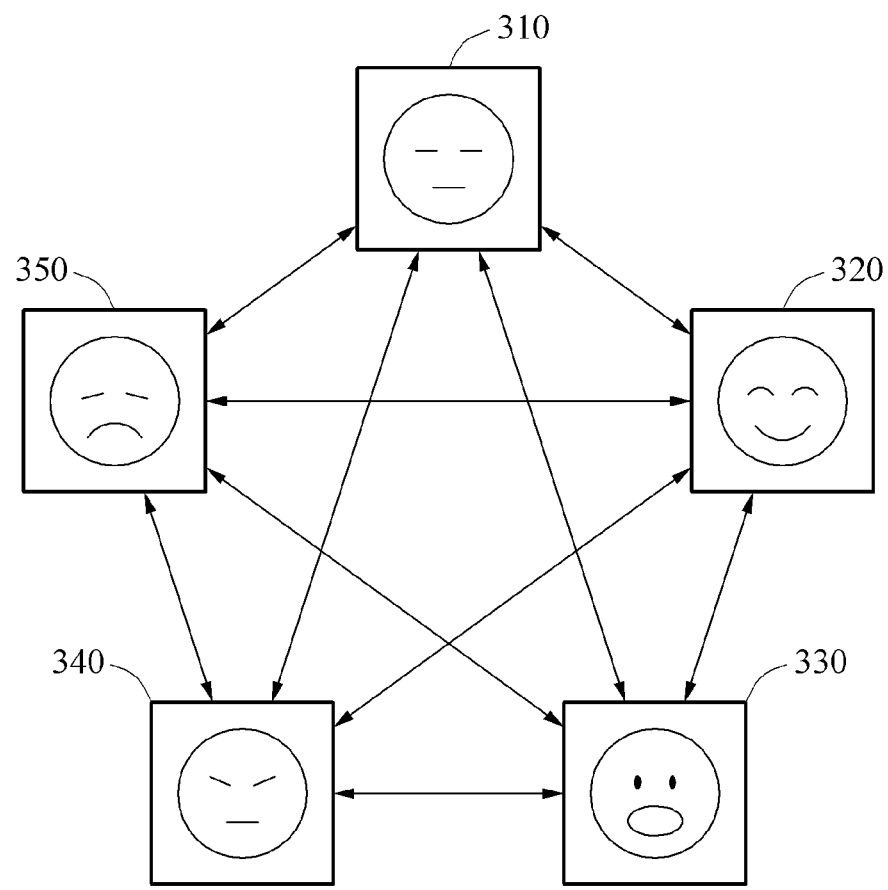
FIG. 3 is a diagram illustrating an example of images of various facial expressions.

FIG. 3 is a diagram illustrating an example of images of various facial expressions. FIG. 3 illustrates an image 310 of a neutral facial expression, an image 320 of a happy facial expression, and an image 330 of a surprised facial expression, an image 340 of an angry facial expression, and an image 350 of a sad facial expression.

For example, a predetermined number of facial expression images may be used to recognize a facial expression. Although it is assumed that five facial expression images are used below, a greater or lesser number or a lesser number of facial expression images may be used to recognize a facial expression without departing from the sprit or scope of the illustrative examples described. At least one facial expression image may be selected to be compared with an input image. For example, in response to a neutral facial expression being determined to be a reference, the image 310 may be a reference image. A facial expression recognizing apparatus may learn differences between the image 310 and each of the images 320 through 350. For example, it is assumed that a difference between the image 310 and the image 320 is D1, and a difference between the image 310 and the image 340 is D2. In an example, the facial expression recognizing apparatus may determine that an input image represents a happy facial expression in response to a difference between the input image and a reference image being D1. In an example, the facial expression recognizing apparatus may determine that the input image represents an angry facial expression in response to the difference between the input image and the reference image being D2.

To determine the difference between the input image and the reference image, the reference image may be provided to the facial expression recognizing apparatus. As described above, the reference image may be a photograph of a user and provided for the facial expression recognizing apparatus, or may be directly generated by the facial expression recognizing apparatus. When the neutral facial expression being the reference image, as described above, the user may be requested to make the neutral facial expression by the facial expression recognizing apparatus or a device including the facial expression recognizing apparatus. In another example, the reference image is obtained by photographing the user with the neutral facial expression by the facial expression recognizing apparatus or the device including the facial expression recognizing apparatus. In an example, the facial expression recognizing apparatus is trained in advance to generate the reference image based on the input image. In an example, the facial expression recognizing apparatus may generate the reference image based on the input image in response to the input image being received. When a reference facial expression is another facial expression other than the neutral facial expression, the facial expression recognizing apparatus may photograph or generate a reference image corresponding to another facial expression, and recognize a facial expression represented in the input image based on a corresponding reference image.

As described above, a plurality of reference images may be used. For example, in response to the neutral facial expression and the happy facial expression being determined to be references, the image 310 may be a first reference image and the image 320 may be a second reference image. The facial expression recognizing apparatus may learn the differences between the image 310 and each of the images 320 through 350, and differences between the image 320 and each of the images 310, 330, 340, and 350. For example, it is assumed that a difference between the image 310 and the image 330 is D3, and a difference between the image 320 and the image 330 is D4. In an example, the facial expression recognizing apparatus determines that the input image represents the surprised facial expression in response to a difference between the input image and the first reference image being D3 and a difference between the input image and the second reference image being D4.

In an example, the facial expression recognizing apparatus learns a sum of values of differences. When a sum of a value of the difference between the input image and the first reference image and a value of the difference between the input image and the second reference image being D3+D4, the facial expression recognizing apparatus may determine that the input image represents the surprised facial expression. When the reference images is used, the facial expression recognizing apparatus or the device including the facial expression recognizing apparatus may photograph or generate the reference images to recognize the facial expression of the input image. In an example, the facial expression recognizing apparatus generates the reference images using a plurality of auto encoders that are trained in advance.

Figure 4:
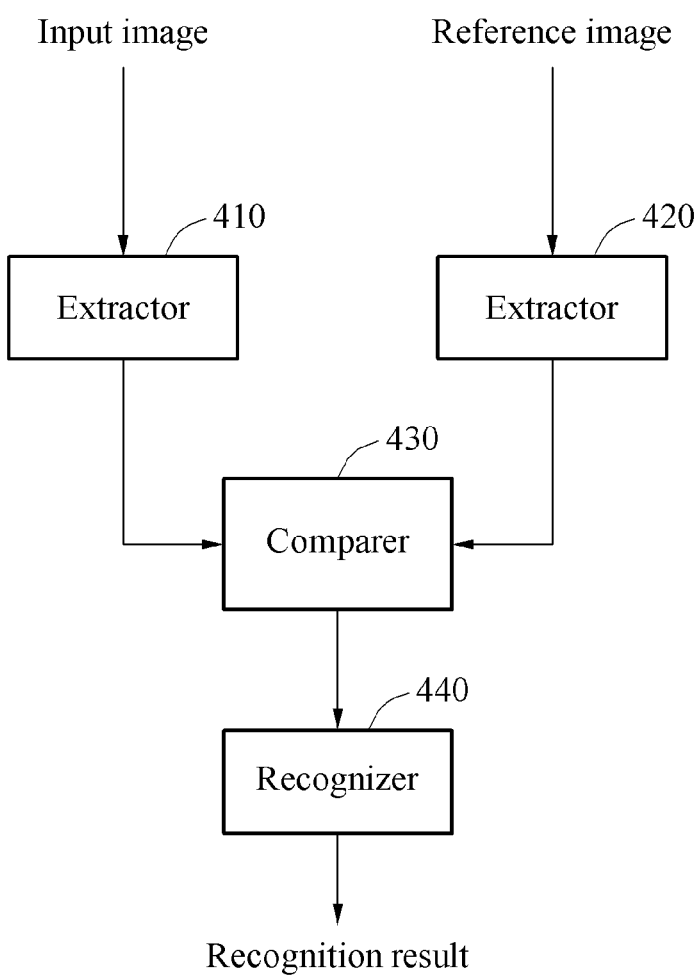
FIG. 4 is a diagram illustrating an example of a process of recognizing a facial expression by receiving a reference image.

FIG. 4 is a diagram illustrating an example of a process of recognizing a facial expression by receiving a reference image. Referring to FIG. 4, an extractor 410 is configured to receive an input image and an extractor 420 receives the reference image.

The reference image may be obtained by photographing a user with a predetermined facial expression. The extractor 410 extracts a feature from the input image, and the extractor 420 extracts a feature from the reference image. A comparer 430 outputs a comparison result based on a difference between the feature of the input image and the feature of the reference image. A recognizer 440 outputs a recognition result based on the result of the comparison. The result of the recognition may represent a facial expression corresponding to the input image among predetermined facial expressions.

Figure 5:
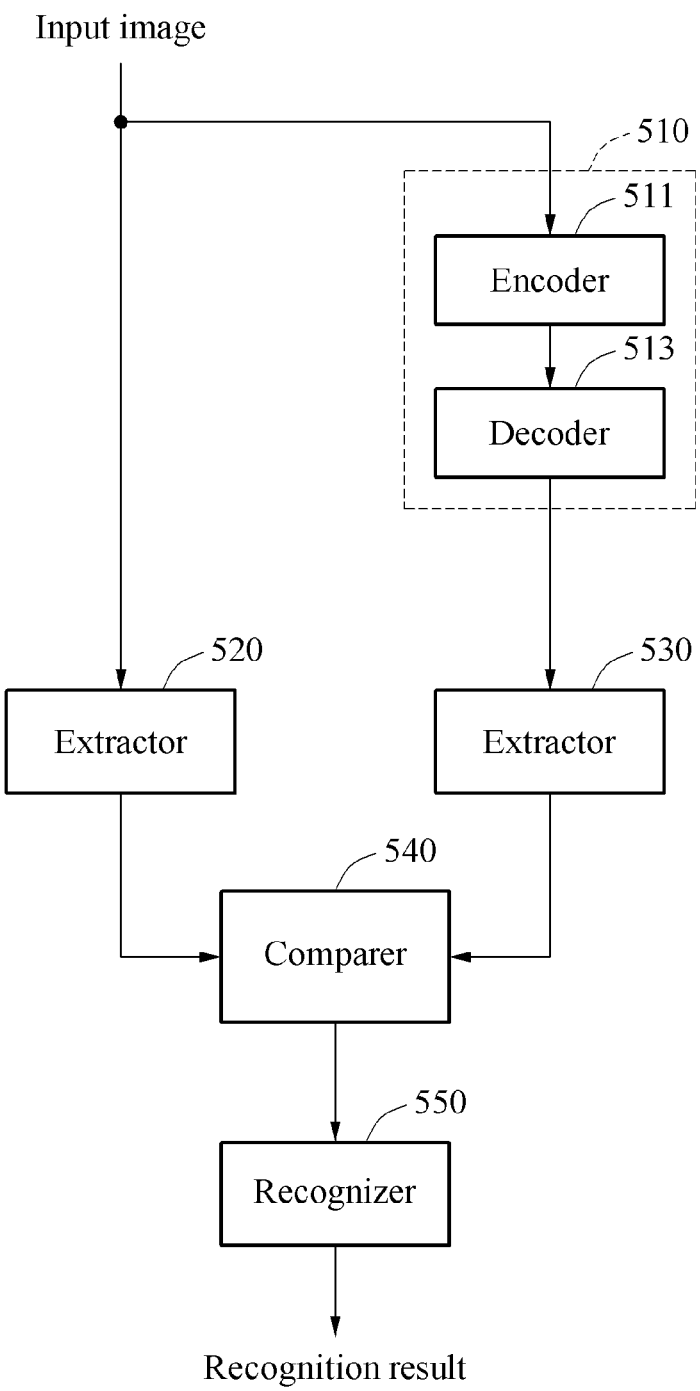
FIG. 5 is a diagram illustrating an example of a process of recognizing a facial expression.

FIG. 5 is a diagram illustrating an example of a process of recognizing a facial expression. Referring to FIG. 5, an auto encoder 510 includes an encoder 511 and a decoder 513.

The auto encoder 510 generates a reference image based on an input image. The encoder 511 encodes the input image and the decoder 513 decodes the encoded input image. An output of the decoder 513 corresponds to the reference image. In an example, the auto encoder 510 is trained in advance to generate the reference image in response to the input image being input. An extractor 520 extracts a feature from the input image and an extractor 530 extracts a feature from the reference image generated by the encoder 510. A comparer 540 outputs the comparison result based on a difference between the feature of the input image and the feature of the reference image. A recognizer 550 outputs the recognition result based on the comparison result.

Figure 6:
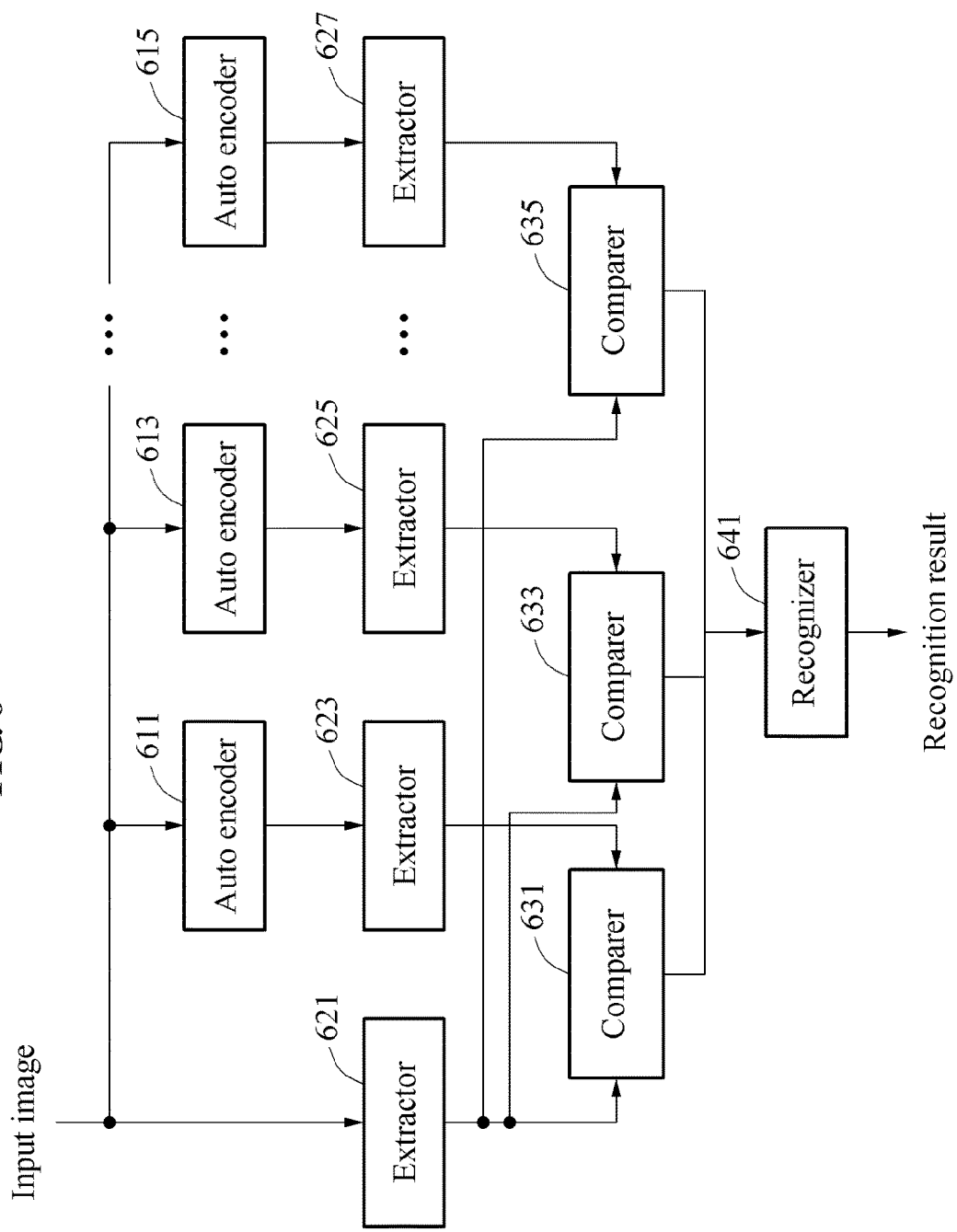
FIG. 6 is a diagram illustrating an example of a process of recognizing a facial expression using reference images.

FIG. 6 is a diagram illustrating an example of a process of recognizing a facial expression using reference images. Referring to FIG. 6, an input image is provided for an extractor 621 and auto encoders 611, 613, and 615.

The auto encoders 611, 613, and 615 generate a first reference image, a second reference image, and an n-th reference image, respectively. The extractor 621 extracts a feature from the input image, an extractor 623 extracts a feature from the first reference image, an extractor 625 extracts a feature from the second reference image, and an extractor 627 extracts a feature from the n-th reference image. A comparer 631 outputs a first comparison result based on a difference between the feature of the input image and the feature of the first reference image, a comparer 633 outputs a second comparison result based on a difference between the feature of the input image and the feature of the second reference image, and a comparer 635 outputs an n-th comparison result based on a difference between the feature of the input image and the feature of the n-th reference image. A recognizer 614 outputs a recognition result based on the first comparison result through the n-th comparison result.

Figure 7:
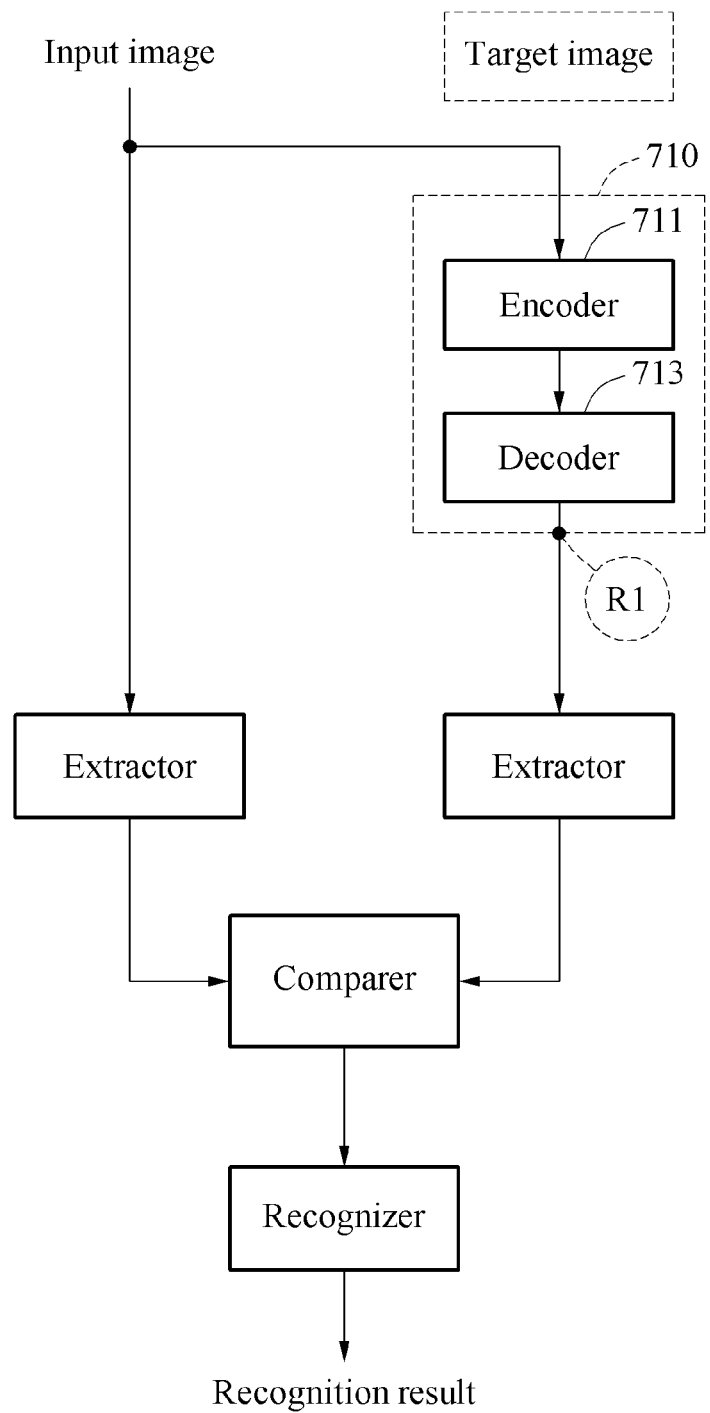
FIG. 7 is a diagram illustrating an example of a process of training an auto encoder using a loss function.

FIG. 7 is a diagram illustrating an example of a process of training an auto encoder using a loss function. FIG. 7 illustrates a loss function R1 for training an auto encoder 710.

The auto encoder 710 includes an encoder 711 and a decoder 713. The encoder 711 and the decoder 713 may be trained to decrease a difference between a reference image and a target image corresponding to a facial expression to be represented through a reference image. As described above, at least one facial expression among various facial expressions may be determined to be a reference, and the target image may represent the facial expression determined to be the reference. For example, in response to a neutral facial expression being determined to be a reference, an image representing the neutral facial expression is a target image. A reference image $\tilde{I}_0$ to generated by the auto encoder 710 may be expressed as shown below.

$$\tilde{I}_0 = g_0(f_0(I)) = g_0(I') \quad \text{[Equation 2]}$$

In Equation 2, $f_0$ denotes an encoding function of the encoder 711 and $g_0$ denotes a decoding function of the decoder 713. I denotes an input image and I' denotes an output of the encoding function $f_0$ related to the input image I. In an example, the encoding function $f_0$ and the decoding function $g_0$ are statistical models. For example, the encoding function $f_0$ and the decoding function $g_0$ may be expressed as shown below.

$$f_0(I) = q(I'|I), g_0(I') = p(I_0|I') \quad \text{[Equation 3]}$$

In Equation 3, q denotes a statistical model of the encoding function $f_0$, p denotes a statistical model of the decoding function $g_0$, and $I_0$ denotes a target image. The auto encoder 710 may be trained based on the loss function R1. Parameters $\theta^{f_0*}$, $\theta^{g_0*}$ that are learned based on the loss function R1 may be expressed as shown below.

$$\theta^{f_0*}, \theta^{g_0*} = \underset{\theta^{f_0},\theta^{g_0}}{\operatorname{argmin}} \sum R1(I_0, \tilde{I}_0) \quad \text{[Equation 4]}$$

$$\text{where } R1(I_0, \tilde{I}_0) = \|I_0 - \tilde{I}_0\|^2$$

The auto encoder 710 may be repeatedly trained to minimize a difference between a reference image $\tilde{I}_0$ and the target image $I_0$ using Equation 4. Thus, the auto encoder 710 may generate the reference image $\tilde{I}_0$ being similar to the target image $I_0$ based on the input image I.

Figure 8:
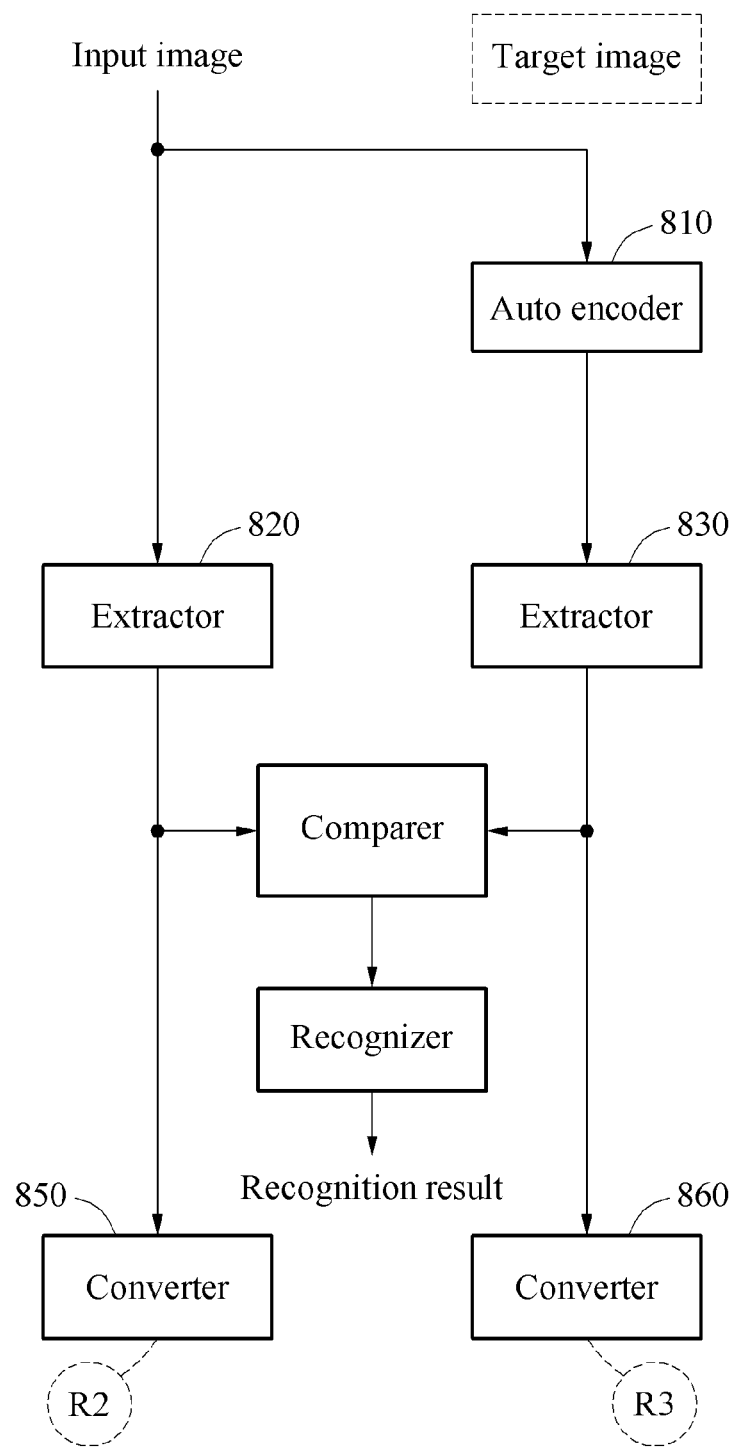
FIG. 8 is a diagram illustrating an example of a process of training an extractor using a loss function.

FIG. 8 is a diagram illustrating an example of a process of training an extractor using a loss function. FIG. 8 illustrates loss functions R2 and R3 for training converters 850 and 860.

An extractor 820 extracts a feature from an input image and an extractor 830 extracts a feature from a reference image output by an auto encoder 810. The converter 850 converts the feature of the input image into a first image and the converter 860 converts the feature of the reference image into a second image. The auto encoder 810, the extractors 820 and 830, and the converters 850 and 860 may be trained based on the loss functions R2 and R3. Parameters $\theta^{f*}$, $\theta^{g_1*}$ learned based on the loss function R2 may be expressed as shown below.

$$\theta^{f*}, \theta^{g_1*} = \underset{\theta^{f},\theta^{g_1}}{\operatorname{argmin}} \sum R2(I, \tilde{I}) \quad \text{[Equation 5]}$$

$$\text{where } R2(I, \tilde{I}) = \|I - \tilde{I}\|^2$$

In Equation 5, f denotes an encoding function of the extractor 820, $g_1$ denotes a decoding function of the converter 850, I denotes an input image, and $\tilde{I}$ denotes a first image converted by the converter 850. The converter 850 may be repeatedly trained to minimize a difference between the input image I and the first image $\tilde{I}$ using Equation 5. Parameters $\theta^{f*}$, $\theta^{g_{10}*}$ learned based on the loss function R3 may be expressed as shown below.

$$\theta^{f*}, \theta^{g_{10}*} = \underset{\theta^{f},\theta^{g_{10}}}{\operatorname{argmin}} \sum R3(I_0, \tilde{I}_0') \quad \text{[Equation 6]}$$

$$\text{where } R3(I_0, \tilde{I}_0') = \|I_0 - \tilde{I}_0'\|^2$$

In Equation 6, f denotes an encoding function of the extractor 830, $g_{10}$ denotes a decoding function of the converter 860, $I_0$ denotes a target image, and $\tilde{i}$ denotes a second image converted by the converter 860. Because the extractors 820 and 830 share parameters, respective encoding functions of the extractors 820 and 830 may be identically defined. The converter 860 may be repeatedly trained to minimize a difference between the target image $I_0$ and the second image $\tilde{i}$ using Equation 6.

Under an influence of back propagation caused by training of the converters 850 and 860, the auto encoder 810, the extractors 820 and 830, and the converters 850 and 860 may be trained together. An accuracy of each of the auto encoder 810 and the extractors 820 and 830 may increase as the training progresses and thus, a recognition performance of a facial expression recognizing apparatus may be enhanced.

Figure 9:
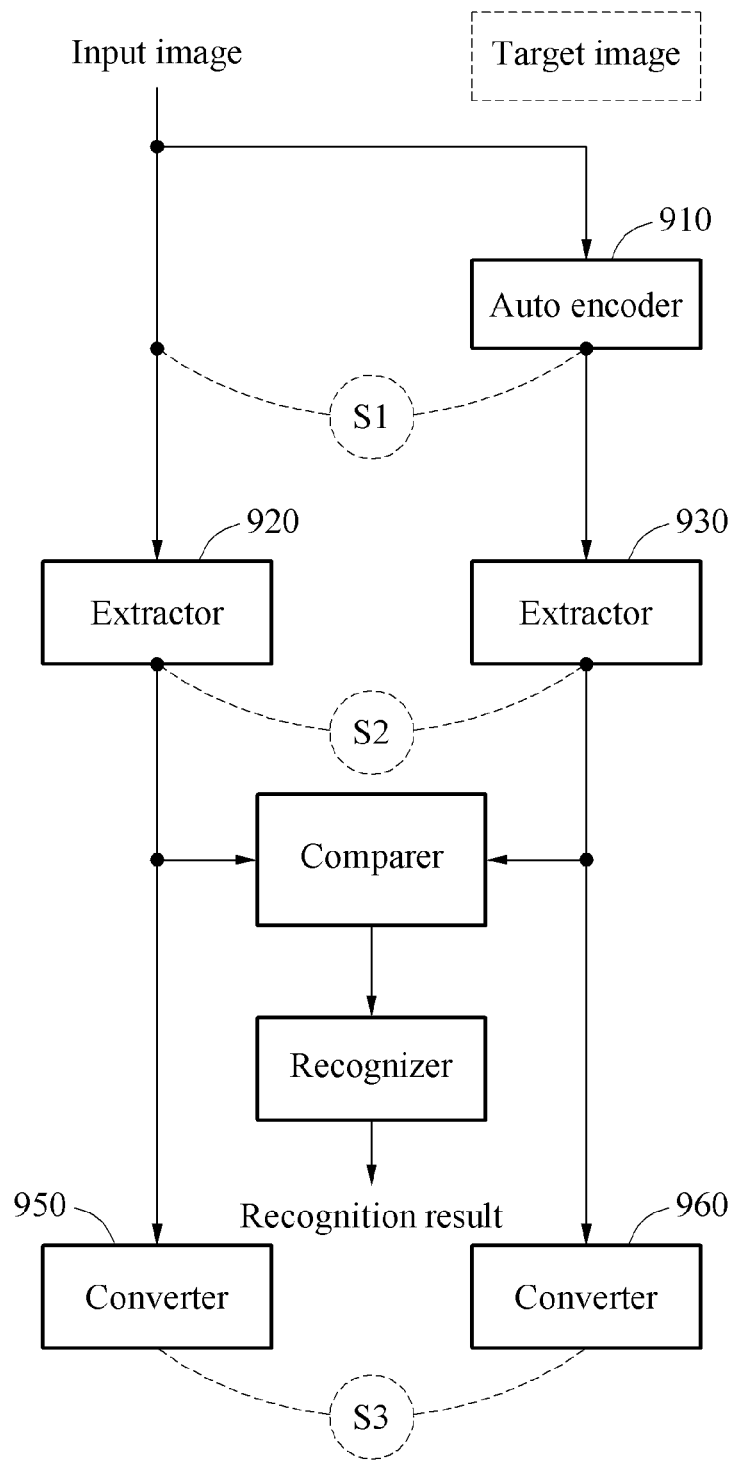
FIG. 9 is a diagram illustrating an example of a training process using a comparison function.

FIG. 9 is a diagram illustrating an example of a training process using a comparison function. FIG. 9 illustrates comparison functions S1, S2, and S3 for training an auto encoder 910, extractors 920 and 930, and converters 950 and 960.

The auto encoder 910 may be trained to increase a difference between an input image and a reference image within a threshold based on the comparison function S1. The comparison function S1 may be expressed as shown below.

$$S1(I, \tilde{I}_0) \max(0, m^2 - \|I - \tilde{I}_0\|^2) \quad \text{[Equation 7]}$$

In Equation 7, I denotes an input image, $\tilde{I}_0$ denotes a reference image, and m denotes a threshold. The auto encoder 910 may be trained to minimize a value of the comparison function S1. Thus, when the auto encoder 910 being trained, a difference between the input image I and the reference image $\tilde{I}_0$ may increase within the threshold m. In an example, the extractors 920 and 930 are also trained to increase a difference between a feature of the input image I and a feature of the reference image $\tilde{I}_0$ within the threshold m based on the comparison function S2. The comparison function S2 may be expressed as shown below.

$$S2(f(I), f(\tilde{I}_0)) = \max(0, m^2 - \|f(I) - f(\tilde{I}_0)\|^2) \quad \text{[Equation 8]}$$

In Equation 8, f denotes an encoding function of the extractors 920 and 930, f(I) denotes a feature of the input image I, and $f(\tilde{I}_0)$ denotes a feature of the reference image $\tilde{I}_0$. In an example, the extractors 920 and 930 are trained to minimize a value of the comparison function S2. Thus, when the extractors 920 and 930 are trained, a difference between the feature f(I) of the input image I and the feature $f(\tilde{I}_0)$ of the reference image $\tilde{I}_0$ may increase within the threshold m. Under an influence of back propagation caused by training of the extractors 920 and 930, the auto encoder 910 and the extractors 920 and 930 may be trained together.

The converters 950 and 960 may be trained to increase a difference between a first image converted by the converter 950 and a second image converted by the converter 960 within the threshold m based on the comparison function S3. The comparison function S3 may be expressed as shown below.

$$S3(g_1(f(I)), g_{10}(f(\tilde{I}_0))) = \max(0, m^2 - \|g_1(f(I)) - g_{10}(f(\tilde{I}_0))\|^2) \quad \text{[Equation 9]}$$

In Equation 9, $g_1$ denotes a decoding function of the converter 950, $g_{10}$ denotes a decoding function of the converter 960, $g_1(f(I))$ denotes the first image converted by the converter 950, and $g_{10}(f(I_0))$ denotes the second image converted by the converter 960. The converters 950 and 960 may be trained to minimize a value of the comparison function S3. Thus, when the converters 950 and 960 are trained, a difference between the first image $g_1(f(I))$ and the second image $g_{10}(f(I_0))$ may increase within the threshold m. Under the influence of the back propagation caused by training of the converters 950 and 960, the auto encoder 910, the extractors 920 and 930, and the converters 950 and 960 may be trained together. Because a minimum difference between the input image I and the reference image $\tilde{I}_0$ is determined based on the comparison functions S1, S2, and S3, a facial expression recognizing apparatus may accurately distinguish similar facial expressions.

Figure 10:
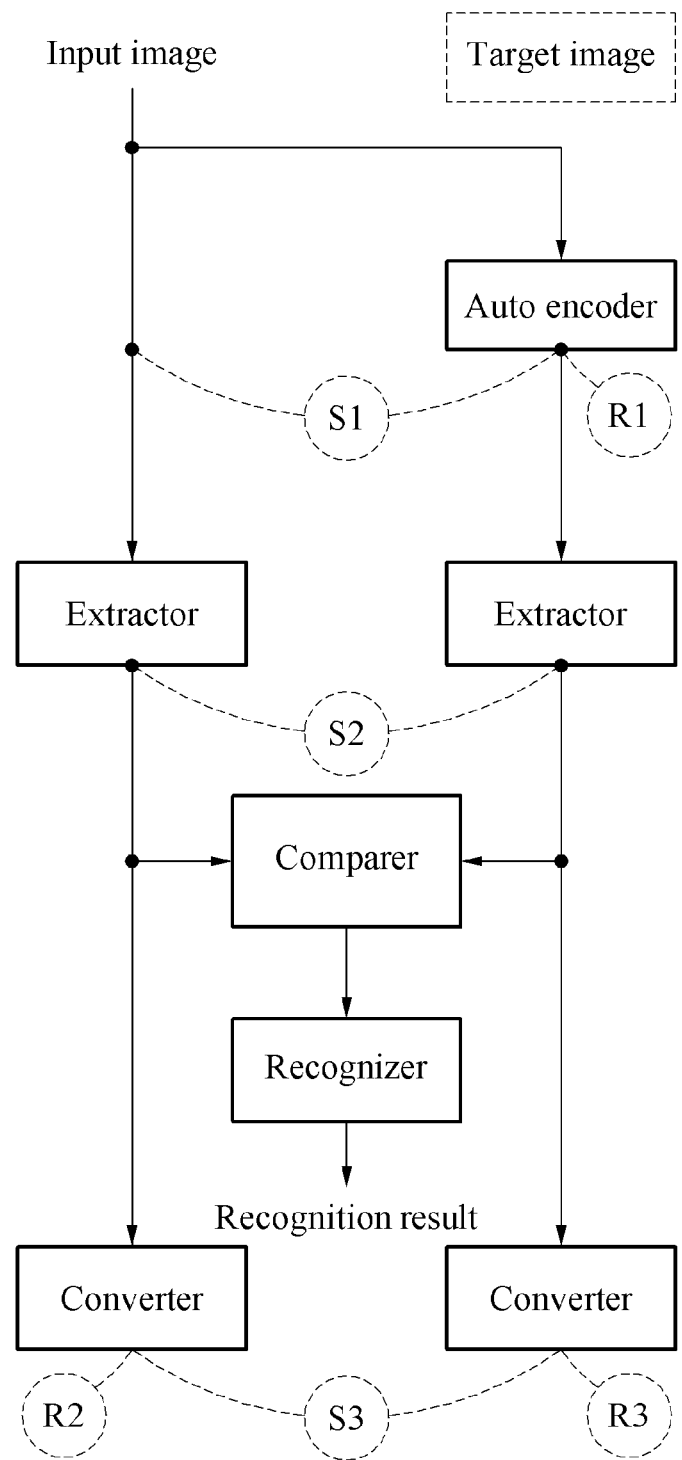
FIG. 10 is a diagram illustrating an example of a training process using a loss function and a comparison function.

FIG. 10 is a diagram illustrating an example of a training process using a loss function and a comparison function. FIG. 10 illustrates loss functions R1, R2, and R3, and comparison functions S1, S2, and S3.

In an example, a facial expression recognizing apparatus may be trained by at least one of the loss functions R1, R2, and R3 and the comparison functions S1, S2, and S3. When a type of a facial expression of an input image differs from a type of a facial expression of a target image, the facial expression recognizing apparatus may be trained based on a comparison function. When the type of the facial expression of the input image is identical to the type of the facial expression of the target image, the facial expression recognizing apparatus may be trained based on a loss function instead of the comparison function. The facial expression of the input image may be compared to the facial expression of the target image based on a threshold. The an example, the threshold is predetermined. For example, when a similarity between the facial expression of the input image and the facial expression of the target image being greater than the threshold, the facial expression recognizing apparatus may be trained based on the comparison functions S1, S2, and S3. When the similarity between the facial expression of the input image and the facial expression of the target image is less than the threshold, the facial expression recognizing apparatus may be trained based on the loss functions R1, R2, and R3. In another example, the facial expression recognizing apparatus may be mapped to a label corresponding to a facial expression represented in the input image. The facial expression recognizing apparatus may be trained to decrease a difference between the label of the input image and a recognition result.

Figure 11:
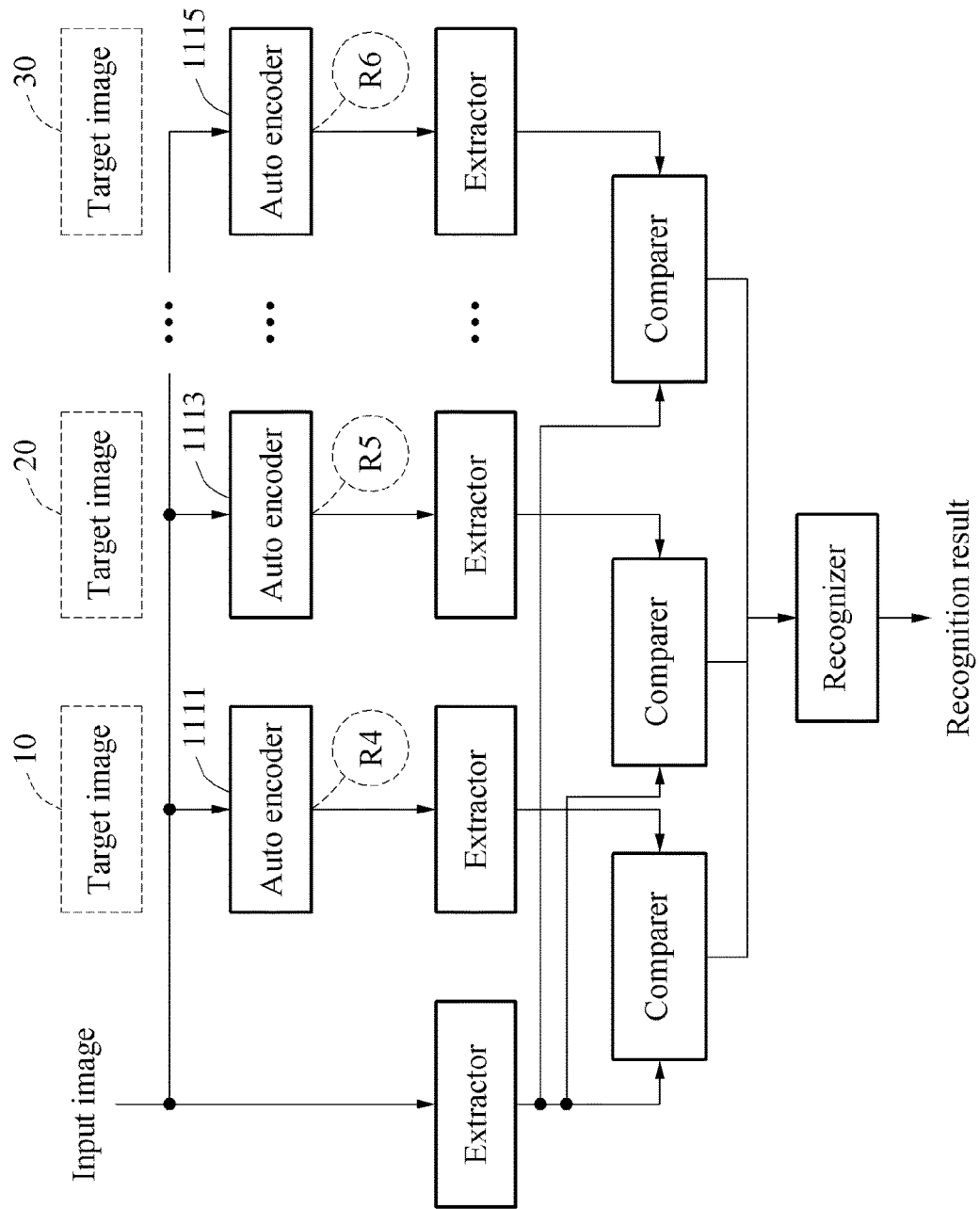
FIG. 11 is a diagram illustrating an example of a training process using target images.

FIG. 11 is a diagram illustrating an example of a training process using a plurality of target images. FIG. 11 illustrates auto encoders 1111 through 1115.

Based on an input image, the auto encoder 1111 through the auto encoder 1115 may generate a first reference image through an n-th reference image, respectively. The auto encoder 1111 may be trained to decrease a difference between a first reference image and a target image 10 based on a loss function R4, the auto encoder 1113 may be trained to decrease a difference between a second reference image and a target image 20 based on a loss function R5, and the auto encoder 1115 may be trained to decrease a difference between a third reference image and a target image 30 based on a loss function R6. The auto encoders 1111 through 1115 may generate, based on the input image, the first reference image through the n-th reference image similar to the target images 10 through 30, respectively.

Figure 12:
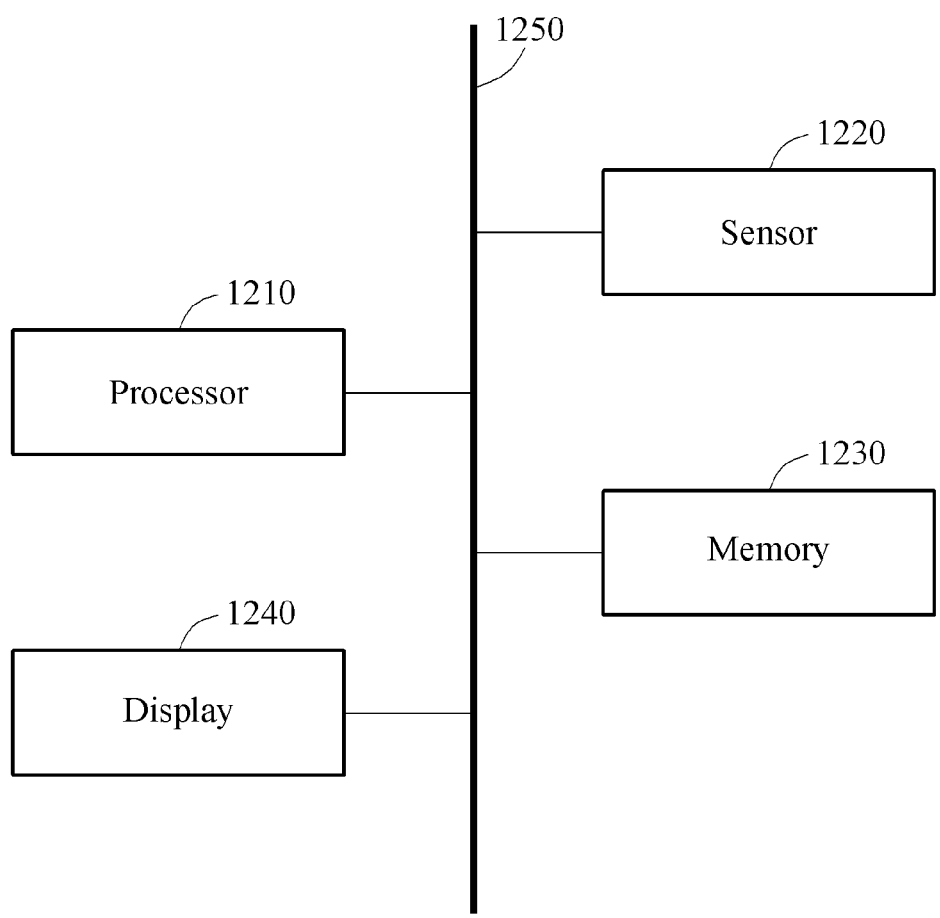
FIG. 12 is a diagram illustrating an example of a facial expression recognizing apparatus.

FIG. 12 is a diagram illustrating an example of a facial expression recognizing apparatus 1200. Referring to FIG. 12, the facial expression recognizing apparatus includes a processor 1210, a sensor 1220, a memory 1230, and a display 1240. The processor 1210, the sensor 1220, the memory 1230, and the display 1240 may communicate with each other via a bus 1250.

The sensor 1220 includes at least one sensor such as, for example an image sensor, a proximity sensor, and an infrared sensor for photographing an input image and a reference image. The sensor 1220 may photograph the input image and the reference image based on a well-known method, for example, a method of converting an optical image into an electrical signal. The sensor 1220 may transmit at least one of a photographed color image, a depth image, or an infrared image to at least one of the processor 1210 or the memory 1230.

The processor 1210 may include any one or any combination of above-described apparatuses or perform at least one of above-described methods. For example, the processor 1210 may process, for example, the above-described operation for recognizing a facial expression. In more detail, the processor 1210 extracts a feature from an input image, extracts a feature from a reference image, and recognizes a user facial expression based on a difference between the feature of the input image and the feature of the reference image.

The memory 1230 stores instructions to be read by a computer. In response to the instructions stored in the memory 120 being executed by the processor 1210, the processor 1210 may process the operation for recognizing the facial expression. Also, the memory 1230 stores data for recognizing the facial expression. For example, the memory 1230 stores a parameter for an auto encoder, an extractor, a comparer, and a recognizer.

In an example, the facial expression recognizing apparatus 1200 recognizes the facial expression from the input image, and displays the user facial expression on the display 1240. In an example, the display 1240 may be a physical structure that includes one or more hardware components that provide the ability to render a user interface and/or receive user input. The display 1240 can encompass any combination of display region, gesture capture region, a touch sensitive display, and/or a configurable area. In an example, the display 1240 can be embedded in the facial expression recognizing apparatus 1200. In an example, the display 1240 is an external peripheral device that may be attached to and detached from the apparatus 1200. The display 1240 may be a single-screen or a multi-screen display. A single physical screen can include multiple displays that are managed as separate logical displays permitting different content to be displayed on separate displays although part of the same physical screen. The display 1240 may also be implemented as an eye glass display (EGD), which includes one-eyed glass or two-eyed glasses.

The processor 1210 executes instructions or programs, and controls the facial expression recognizing apparatus. The facial expression recognizing apparatus is connected to an external device, for example, a personal computer (PC) or a network, through an input and output device (not shown), and thereby performs a data exchange.

Figure 13:
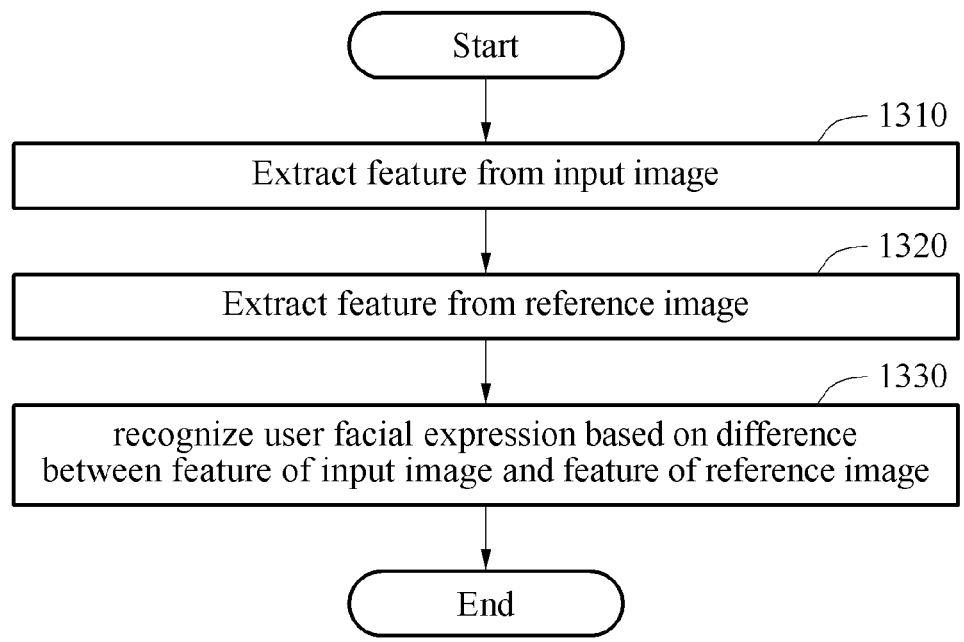
FIG. 13 is a diagram illustrating an example of a method of recognizing a facial expression.

FIG. 13 is a diagram illustrating an example of a method of recognizing a facial expression. The operations in FIG. 13 may be performed in the sequence and manner as shown, although the order of some operations may be changed or some of the operations omitted without departing from the spirit and scope of the illustrative examples described. Many of the operations shown in FIG. 13 may be performed in parallel or concurrently. One or more blocks of FIG. 13, and combinations of the blocks, can be implemented by special purpose hardware-based computer that perform the specified functions, or combinations of special purpose hardware and computer instructions. In addition to the description of FIG. 13 below, the above descriptions of FIGS. 1-12 is also applicable to FIG. 13, and are incorporated herein by reference. Thus, the above description may not be repeated here.

Referring to FIG. 13, in 1310, a facial expression recognizing apparatus extracts a feature from an input image. In 1320, the facial expression recognizing apparatus extracts a feature from a reference image. In 1330, the facial expression recognizing apparatus recognizes a user facial expression based on a difference between the feature of the input image and the feature of the reference image.

The facial expression recognizing apparatus 110, extractors, comparers recognizers, auto encoders, decoders, converters, extractors 410, 420, 621, 623, 625, 627, 920, and 930, comparers 430, 631, 633, and 635, recognizers 440, and 614, auto encoders 510, 611, 613, 615, 710, 810, 820, 830, 910, 1111, 1113, and 1115, encoders 511, and 711, decoders 513, and 713, and converters 850, 860, 950, 960, other apparatuses, units, modules, devices, and other components illustrated in FIGS. 1-11 and 12 that perform the operations described herein with respect to FIG. 13 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIG. 13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor-implemented method of recognizing a facial expression of a user, the method comprising:
    extracting a first feature from an input image, the first feature corresponding to a first expression represented in the input image;
    generating a reference image based on the input image;
    obtaining a second feature from the reference image, the second feature corresponding to a second expression represented in the reference image;
    determining a difference between the first expression and the second expression based on the first feature and the second feature; and
    recognizing the facial expression based on the determined difference between the first expression and the second expression.

2. The method of claim 1, wherein the first feature of the input image and the second feature of the reference image are respectively extracted and obtained by extractors that are trained in advance.

3. The method of claim 2, wherein the extractors are trained in advance to increase the difference between the first feature of the input image and the second feature of the reference image within a threshold.

4. The method of claim 2, wherein the extractors share a parameter.

5. The method of claim 2, wherein the extractors are trained in advance to decrease a difference between the input image and a first image converted based on the first feature of the input image, and to decrease a difference between a second image converted based on the second feature of the reference image and a target image corresponding to a facial expression to be represented through the reference image.

6. The method of claim 5, wherein the extractors are trained in advance to increase a difference between the first image and the second image within a threshold.

7. The method of claim 1, wherein the obtaining of the second feature from the reference image comprises obtaining the second feature from a first reference image and a third feature from a second reference image, and the performing of the recognition of the user facial expression comprises recognizing the user facial expression based on a difference between the first feature of the input image and the second feature, and a difference between the first feature of the input image and the third feature.

8. The method of claim 1, wherein the difference comprises an element-wise difference between a feature vector, corresponding to the first feature, extracted from the input image and a feature vector, corresponding to the second feature, extracted from the reference image.

9. A non-transitory computer-readable storage medium storing instructions that, when executed by a processor, causes the processor to perform the method of claim 1.

10. A processor-implemented method of recognizing a facial expression of a user, the method comprising:
    extracting a feature from an input image;
    encoding the input image using an encoder that is trained in advance; and
    generating a reference image by decoding the encoded input image using a decoder that is trained in advance;
    extracting a feature from the reference image; and
    recognizing the facial expression based on a difference between the feature of the input image and the feature of the reference image.

11. The method of claim 10, wherein the encoder and the decoder are trained in advance to decrease a difference between the reference image and a target image corresponding to a facial expression to be represented through the reference image.

12. The method of claim 11, wherein the encoder and the decoder are trained in advance to increase a difference between the input image and the reference image within a threshold.

13. A facial expression recognizing apparatus comprising:
    a processor configured
    to extract from a input image a first feature that corresponds to a first expression represented in the input image,
    to generate a reference image based on the input image;
    to obtain from a reference image a second feature that corresponds to a second expression represented in the reference image,
    to determine a difference between the first expression and the second expression based on the first feature and the second feature, and
    to recognize a facial expression of a user based on the determined difference between the first expression and the second expression.

14. A processor-implemented method of recognizing a facial expression of a user, the method comprising:
    extracting a first feature from an input image, the first feature corresponding to a first expression represented in the input image;
    obtaining a second feature from a reference image, the second feature corresponding to a second expression represented in the reference image;
    determining a difference between the first expression and the second expression based on the first feature and the second feature; and
    recognizing the facial expression based on the determined difference between the first expression and the second expression,
    wherein the first feature of the input image and the second feature of the reference image are respectively extracted and obtained by extractors that are trained in advance, and wherein the extractors are trained in advance to decrease a difference between the input image and a first image converted based on the first feature of the input image, and to decrease a difference between a second image converted based on the second feature of the reference image and a target image corresponding to a facial expression to be represented through the reference image.

15. The method of claim 14, wherein the extractors are trained in advance to increase a difference between the first image and the second image within a threshold.

16. The apparatus of claim 13, wherein the reference image is generated based on the input image using a trained neural network based statistical model.

17. The apparatus of claim 13 wherein the feature of the input image and the feature of the reference image are extracted by extractors that are trained in advance.

18. The apparatus of claim 17, wherein the extractors are trained in advance to increase a difference between the feature of the input image and the feature of the reference image within a threshold.

19. The apparatus of claim 17, wherein the extractors share a parameter.

20. The apparatus of claim 17, wherein the extractors are trained in advance to decrease a difference between the input image and a first image converted based on the feature of the input image, and to decrease a difference between a second image converted based on the feature of the reference image and a target image corresponding to a facial expression to be represented through the reference image.

21. The apparatus of claim 20, wherein the first image and the second image are converted by converters that are trained in advance, and the converters are trained in advance to increase a difference between the first image and the second image within a threshold.

22. The apparatus of claim 13, further comprising a memory configured to store instructions, which when executed by the processor configure the processor to perform the extraction of the first feature, the obtaining of the second features, the determination of the difference, and the recognition of the facial expression of the user.

23. The apparatus of claim 13,
wherein the reference image comprises a first reference image and a second reference image, and
wherein the processor is configured to obtain the second feature from the first reference image and a third feature from the second reference image, and to recognize the user facial expression based on a difference between the first feature of the input image and the second feature and a difference between the first feature of the input image and the third feature.

24. A facial expression recognizing apparatus comprising:
a processor configured to extract a feature from an input image, encode the input image using an encoder that is trained in advance, generate a reference image by decoding the encoded input image using a decoder that is trained in advance, extract a feature from the reference image, and recognize a facial expression of a user based on a difference between the feature of the input image and the feature of the reference image.

25. The apparatus of claim 24, wherein the encoder and the decoder are trained in advance to decrease a difference between the reference image and a target image corresponding to a facial expression to be represented through the reference image.

26. The apparatus of claim 25, wherein the encoder and the decoder are trained in advance to decrease a difference between the input image and the reference image within a threshold.

27. The apparatus of claim 24, wherein the feature of the input image and the feature of the reference image are extracted by extractors that are trained in advance.

28. The apparatus of claim 27, wherein the extractors are trained in advance to decrease a difference between the input image and a first image converted based on the feature of the input image, and to decrease a difference between a second image converted based on the feature of the reference image and a target image corresponding to a facial expression to be represented through the reference image.

29. The apparatus of claim 28, wherein the first image and the second image are converted by converters that are trained in advance, and the converters are trained in advance to increase a difference between the first image and the second image within a threshold.

30. The apparatus of claim 27, wherein the extractors are trained in advance to increase a difference between the feature of the input image and the feature of the reference image within a threshold.

31. The apparatus of claim 27, wherein the extractors share a parameter.

32. The apparatus of claim 24, wherein the reference image comprises a first reference image and a second reference image, and the processor is configured to perform the extraction of the feature from the reference image by extraction of a first feature from the first reference image and a second feature from the second reference image, and to perform the recognition of the facial expression based on a difference between the feature of the input image and the first feature and a difference between the feature of the input image and the second feature.

33. The apparatus of claim 24, further comprising a memory configured to store instructions, that when executed by the processor configure the processor to perform the extraction of the feature from the input image, encode the input image using the encoder, generate the reference image, extract the feature from the reference image, and recognize the facial expression of the user.

34. A facial expression recognizing apparatus comprising:
a processor configured to extract a feature from an input image, to obtain a feature from a reference image, and to recognize a facial expression of a user based on a difference between the feature of the input image and the feature of the reference image,
wherein the feature of the input image and the feature of the reference image are respectively extracted and obtained by extractors that are trained in advance, and
wherein the extractors are trained in advance to decrease a difference between the input image and a first image converted based on the feature of the input image, and to decrease a difference between a second image converted based on the feature of the reference image and a target image corresponding to a facial expression to be represented through the reference image.

35. The apparatus of claim 34, wherein the first image and the second image are converted by converters that are trained in advance, and the converters are trained in advance to increase a difference between the first image and the second image within a threshold.

36. The method of claim 1, wherein the reference image is generated based on the input image using a trained neural network based statistical model.

37. A facial expression recognizing apparatus comprising:
a processor configured to extract a feature from an input image, to obtain a feature from a reference image, and to recognize a facial expression of a user based on a difference between the feature of the input image and the feature of the reference image,
wherein the reference image comprises a first reference image and a second reference image respectively generated based on the input image, and the processor is further configured to obtain a first feature from the first reference image and a second feature from the second reference image, and to recognize the user facial expression based on a difference between the feature of the input image and the first feature and a difference between the feature of the input image and the second feature.

38. A digital device comprising:
a sensor configured to capture an input image;
a memory configured to store instructions; and
a processor configured to execute the instructions to extract from the input image a first feature that corresponds to a first expression represented in the input image, generate a reference image based on the input image, to obtain from the reference image a second feature that corresponds to a second expression represented in the reference image, to determine a difference between the first expression and the second expression based on the first feature and the second feature, and to recognize a facial expression of a user based on the determined difference between the first expression and the second expression.

39. The digital device of claim 38, wherein the processor comprises:
one or more extractors configured to perform the extraction of the first feature from the input image, and perform the obtaining of the second feature to obtain the second feature from the reference image;
a comparer configured to perform the determination of the difference by comparing the first feature of the input image with the second feature of the reference image; and
a recognizer configured to perform the recognition of the facial expression of the input image based on a result of the comparison.

40. The digital device of claim 38, further comprising a display, and wherein the processor is further configured to display information of the recognized facial expression of the user on the display.

41. The digital device of claim 38, further comprising:
an antenna; and
a cellular radio configured to transmit and receive data via the antenna according to a cellular communications standard,
wherein the processor is further configured to transmit information of the recognized facial expression of the user using the cellular radio.

42. The digital device of claim 38, wherein the reference image is generated based on the input image using a trained neural network based statistical model.

43. A facial expression recognizing apparatus comprising:
a processor configured to extract from a input image a first feature that corresponds to a first expression represented in the input image, to obtain from a reference image a second feature that corresponds to a second expression represented in the reference image, to determine a difference between the first expression and the second expression based on the first feature and the second feature, and to recognize a facial expression of a user based on the determined difference between the first expression and the second expression,
wherein the feature of the input image and the feature of the reference image are extracted by extractors that are trained in advance, and
wherein the extractors are trained in advance to decrease a difference between the input image and a first image converted based on the feature of the input image, and to decrease a difference between a second image converted based on the feature of the reference image and a target image corresponding to a facial expression to be represented through the reference image.

44. The apparatus of claim 43, wherein the first image and the second image are converted by converters that are trained in advance, and the converters are trained in advance to increase a difference between the first image and the second image within a threshold.

* * * * *